March 12, 1963 R. J. WOHL 3,081,393
ELECTRIC VAPORIZERS
Filed July 15, 1958 3 Sheets-Sheet 1

INVENTOR.
ROBERT J. WOHL

March 12, 1963

R. J. WOHL 3,081,393

ELECTRIC VAPORIZERS

Filed July 15, 1958

INVENTOR.
ROBERT J. WOHL

March 12, 1963   R. J. WOHL   3,081,393
ELECTRIC VAPORIZERS
Filed July 15, 1958   3 Sheets-Sheet 3

INVENTOR.
ROBERT J. WOHL

United States Patent Office 3,081,393
Patented Mar. 12, 1963

3,081,393
ELECTRIC VAPORIZERS
Robert J. Wohl, Great Neck, N.Y.
(3327 Jericho Lane, San Jose 28, Calif.)
Filed July 15, 1958, Ser. No. 748,687
1 Claim. (Cl. 219—38)

The present invention relates to electric vaporizers adapted to generate a continuous, uniform flow of vapor from a body of water or other volatile liquid. The invention particularly relates to electric vaporizers of the class mentioned which automatically shut off flow of electric current therein when supply of vaporizable liquid thereto is exhausted.

At present, sick-room steam generators (used for the treatment of croup, colds and other respiratory infections) generally consist of a vessel for containing the water to be vaporized, electrodes immersed in the water, and a top for the vessel containing an orifice for discharge of the steam to be formed. The water is first rendered electroconductive by addition of table salt or other electrolyte and is brought to a boil by direct passage of electric current therethrough.

Vaporizers of the type described have several disadvantages. First, they are generally of small capacity. All the water to be vaporized must be contained within the vessel, and experience has shown that vessels having a working capacity of about a pint are the largest that can be conveniently stored in the modern small home.

Secondly, the vaporizers have a comparatively slow warm-up time as all the water to be vaporized must be heated to boiling before substantial evolution of steam occurs.

Then, they present a serious thermal and electrical hazard. The water in the chamber (and any water leaking therefrom) is in direct contact with the line voltage, and in operation all the water is at the boil. A patient overturning such a vaporizer may thus receive an electrical shock as well as being scalded. Since the water is electrically charged, it is unsafe to replenish the water while the device is in operation.

Fourthly, the devices are unable to vaporize liquids which are non-conductors of electricity.

Fifthly, the rate at which steam is generated is a function of the amount of salt added. The addition of salt is an annoyance, and it is difficult to estimate the right amount to be added. Moreover, the salt ultimately causes a bridge of electrolysis products to form between the electrodes unless removed by periodic cleanings.

The foregoing disadvantages are overcome by the present invention, which provides an electric vaporizer broadly comprising a chamber at least the vertical walls of which are of low thermal conductivity, the chamber having a lower orifice adapted to admit water to be vaporized and an upper orifice adapted to vent the steam to be formed therein, and an electrically insulated immersion heater in a lower part of the chamber. In general outline the vaporizer is a closed tube more or less elongated having an orifice at each end so that when immersed in a body of water the chamber fills by gravity to the level of water around it.

In operation, the immersion heater brings the water in the chamber to the boil. Steam evolves from the upper orifice, with or without medication as desired, and the water lost in this way is replaced by water flooding by gravity from the body of liquid in which the vaporizer is immersed. The process continues until supply of water is exhausted.

The vaporizers of the present invention present the following particular advantages:

(1) They are electrically safe. The flow of current is entirely insulated from the liquid being vaporized, so that there is no possibility of shock.

(2) They are less likely to scald the user. The main body of liquid in which the heater is immersed is comparatively cool, and only the small volume of liquid within the vaporizer is at the boil.

(3) They can be operated continuously. The main body of liquid in which the heater is immersed can be replenished during operation without danger of electrical shock or scalding.

(4) They do not require the addition of electrolyte material. As a result, corrosion and build-up of salt scale are minimized, and the thermal output of the heating elements can be determined at the factory.

The vaporizers of the present invention may and preferably will contain a switch so that the heater therein can be turned on and off conveniently. The switch may be manual or, more advantageously, semi- or completely automatic, as more particularly described below.

The vaporizers of the present invention are preferably tubular in appearance and may be of any convenient length. The invention contemplates that they will be about 6 to 18 inches long so that they may be used in a household cooking vessel or in a bucket.

The vaporizers are more particularly described with reference to the drawings, wherein.

Figures 1, 2:
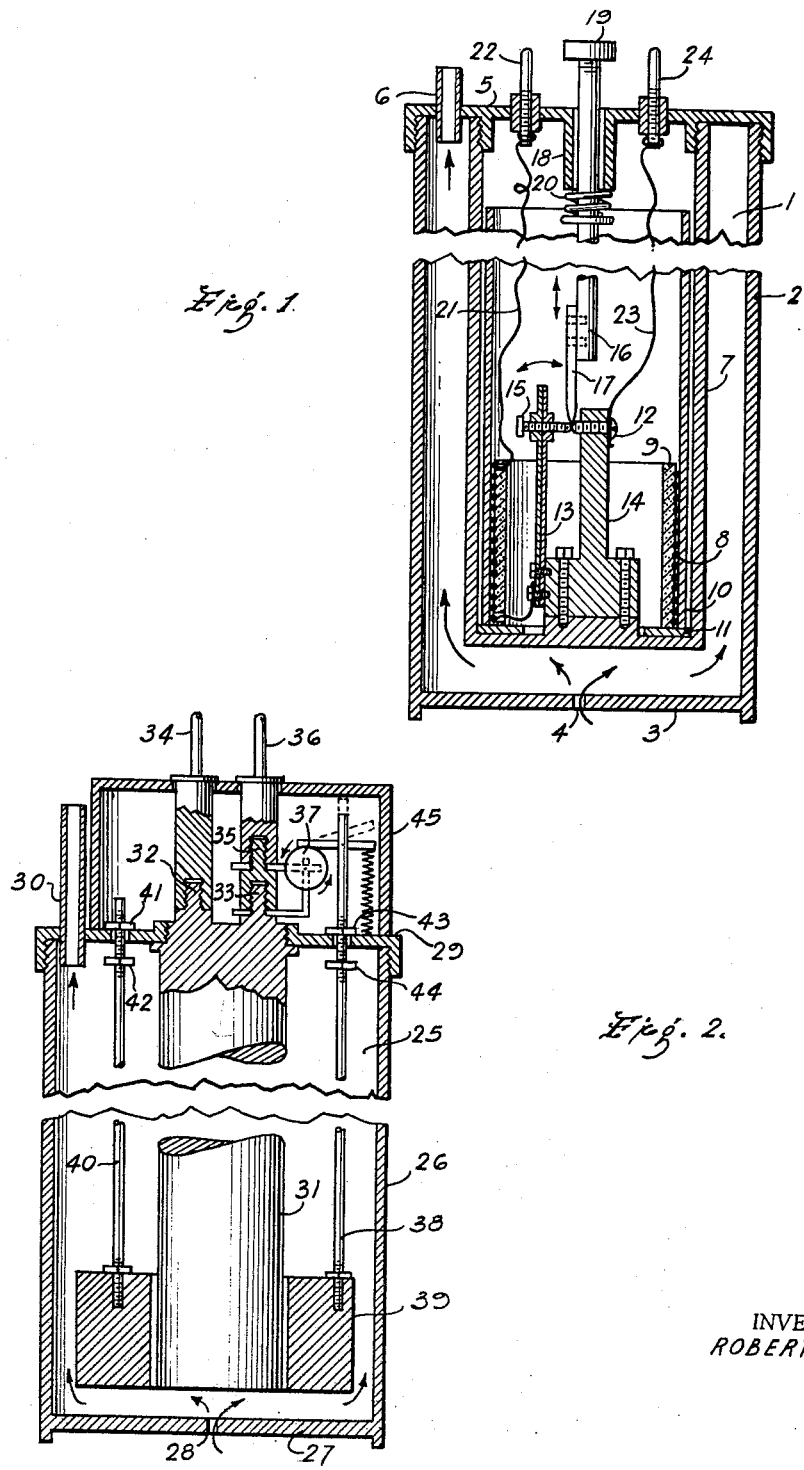
FIG. 1 is a view, largely in vertical section of one form of vaporizer.
FIG. 2 is a similar view of another form of vaporizer.

The device of FIGURE 1 is chiefly composed of vaporizer chamber 1 defined by cylindrical wall 2 of low thermal conductivity, disc shaped bottom 3 containing orifice 4 for admission of water to be vaporized, and top 5 of low thermal conductivity containing discharge tube 6 for the steam to be formed. Inner water-tight metal casing 7 contains heating means and a switch therefor. The heater is composed of Nichrome resistance wire 8 wound on threaded ceramic cylinder 9 insulated from casing 7 by ceramic circumferential cylinder 10 and ceramic base disc 11. The switch is composed of stationary electrical contact 12 in ceramic post support 14, thermally sensitive bimetallic electrical conductor 13 having its bottom screwed to ceramic support post 14 and having its top carrying adjustable contact screw 15, and movable non-conductive shaft 16 carrying insulating strip 17. Bimetallic conductor 13 is prestressed so that at temperatures below about the boiling point of the liquid being vaporized, the top of the element carrying contact 15 tends to arc to the right and at higher temperatures tends to arc to the left.

Shaft 16 slides within cylindrical guide 18. It is raisable by button 19 and in raised position is maintained under light downward force by spring 20. One end of heater coil 8 is connected by wire 21 first to electric contact pin 22, and the other end of coil 8 is connected to bimetallic conductor 13 and therefrom through contacts 15 and 16 and wire 23 to second electrical contact pin 24.

Figure 4:
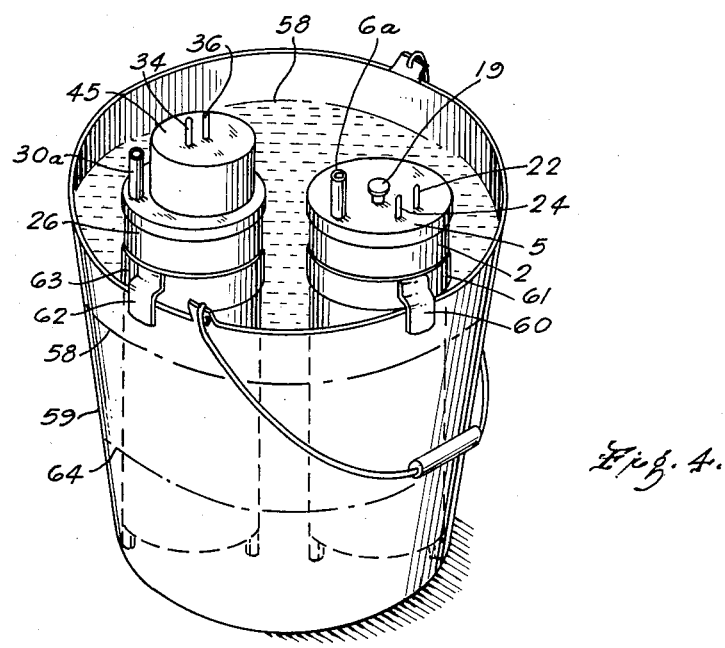
FIG. 4 is a perspective of the vaporizers of FIGS. 1 and 2 showing the vaporizers immersed in a bucket of liquid.

In operation, the device is placed in cold water as shown in FIGURE 4, an electric appliance plug is slipped over contact pins 22 and 24, and button 19 is lifted thereby raising insulator strip 17 to the position shown in FIGURE 1. As a result, prestressed bimetallic conductor 13 carrying contact screw 15 moves to the right causing screw 15 to press firmly against contact 12, as shown in the drawing. Conductor 13 is prestressed sufficiently so that, with adjustment of contact screw 15 as necessary, the electrical circuit remains closed when the water boils. During this phase of the operation strip 17 is in "up" position and rests on contacts 12 and 15 with light pressure resulting from spring 20.

When the supply of water to the vaporizer approaches exhaustion and the temperature of the vaporizer consequently rises, bimetallic conductor 13 arcs to the left permitting insulating strip 17 to move to its "down" position between contacts 12 and 15, thereby interrupting flow of electrical current and causing the vaporizer to cool. After slight cooling has occurred, the top of the bimetallic conductor arcs to the right, bringing contact screw 15 against strip 17 which is still in "down" position. Flow of electrical current, however, does not resume until strip 17 is manually lifted to its "up" position, as shown in FIGURE 1, and until this is done the vaporizer will not re-heat.

The device of FIGURE 2 is chiefly composed of vaporization chamber 25 defined by cylindrical wall 26 of low thermal conductivity, disc-shaped bottom 27 containing orifice 28 for admission of water to be vaporized, and top 29 containing tube 30 for discharge of steam to be formed. Insulated electrical immersion heater 31 is threaded into and is suspended from top 29 in a central part of chamber 25 and is provided with threaded electrical terminals 32 and 33. Terminal 32 is capped with threaded flanged electrical contact pin 34, and terminal 33 is capped first with threaded non-conducting extension 35 which in turn is capped by threaded flanged electrical contact pin 36. Non-conducting extension cap 35 is bridged by rotatable mercury switch 37, actuated in the directions shown by the arrow by shaft 38 threaded into glass foam float 39 surrounding heater 31. Switch 37 is open when float 39 is in "down" position as shown in the drawing and is closed when the float is in "up" position. Auxiliary guide rod 40 ensures that float 39 will rise and fall smoothly without binding. Limit pins 41, 42, 43 and 44 restrict the rising and falling motion of shaft 38 to that sufficient to rotate switch 37 to its "on" and "off" positions. The mechanism is protected by cap 45 of electrically insulating material maintained in tight engagement against top 29 by flanged pins 34 and 36.

In operation, an electric appliance plug is slipped over pins 34 and 36, and the device is placed in a vessel containing water at least sufficiently deep to cause float 39 to rise and close switch 37, the water entering through orifice 28 and flooding chamber 25 by gravity. The water is rapidly brought to the boil, and the steam formed is vented through tube 30. Heating automatically ceases when the level of water in chamber 25 fails so that float 38 returns to its "down" position and causes switch 37 to rotate to its open position as shown in the drawing.

In this and other vaporizers of the present invention the diameter of the upper orifice (i.e., the orifice from which steam is discharged) is advantageously greater than the diameter of the lower orifice (through which the water is admitted) so that back pressure is minimized.

It is further advantageous for the liquid capacity of the vaporizer chamber to be between about 0.1 and 0.5 cc. per watt of electricity consumed by the heater when in operation, so that the warm-up period (the time required to heat water in the vaporizing chamber from room temperature to the boil) is less than about one minute. However, the invention is not limited to vaporizers wherein the ratio of liquid volume to wattage is in this range.

Figure 3:
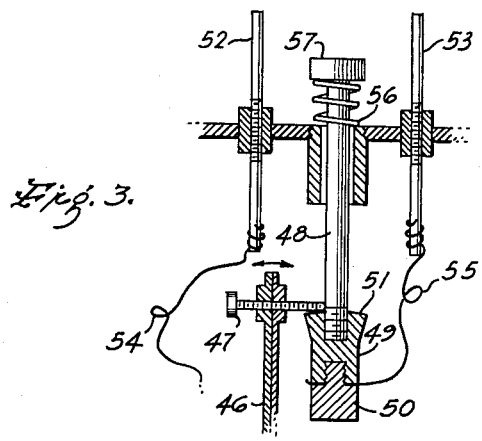
FIG. 3 is a view largely in vertical section of a portion of a vaporizer similar to that of FIG. 1, showing a different switch.

The switch of FIGURE 3 is adapted to work in the vaporizer of FIGURE 1 and is composed of thermally sensitive prestressed bimetallic electric conductor 46 (similar to conductor 13 of FIGURE 1) carrying adjustable contact screw 47, vertically movable electrically non-conductive cylindrical control shaft 48 the bottom of which is threaded into cylindrical electroconductive portion 49 into which in turn is threaded lower electrically non-conductive portion 50. Bimetallic conductor 46 is supported and electrically connected to a heating coil in the same manner as conductor 13 of FIGURE 1. Electric current is supplied to the heater through contact pins 52 and 53 and wires 54 and 55. The top of electroconductive portion 50 is rounded so as to form shoulder 51 which facilitates disengagement of contact screw 47 therefrom. Shaft 48 is lightly loaded in "up" direction by spring 56.

In FIGURE 3 the switch is shown in normal operating or "on" position, button 57 being in depressed position, spring 56 being compressed, contact screw 47 being in engagement with electroconductive portion 49 of the switch, and screw 47 resting on shoulder 51 and holding shaft 48 down against the force of spring 56. When the temperature of the heating element rises owing to depletion of the water, the top of bimetallic element 46 arcs to the left causing contact screw 47 to slip off shoulder 51 and permitting spring-loaded shaft 48 to rise, whereby non-conductive portion 50 of shaft 48 is made to occupy the space previously occupied by electroconductive portion 49. The electrical circuit is thereby broken. The vaporizer cools, whereupon conductor arcs to the right. When conductor 46 has thus returned to its original position, contact screw 47 rests against non-conductive portion 50 of the shaft and thus the circuit remains "off." The switch is reset to "on" position by depressing button 57. The circuit can be opened at any time thereafter by gently lifting and rotating button 57 so as to cause contact screw 47 to slide off shoulder 51 and cause shaft 48 to rise assisted by spring 56. When the shaft has risen as far as it will go, contact screw 47 rests against electro-non-conductive portion 50 of the shaft.

FIGURE 4 shows the vaporizers of FIGURES 1 and 2 (respectively 2 and 26 in the drawing) immersed in water at level 58 in bucket 59. Vaporizer 2 is held against bucket 59 by spring clip 60 welded to sliding friction band 61. Vaporizer 26 is held in similar manner by clip 62 attached to band 63.

When the current is turned on and the vaporizers are in operation, bucket 59 may be replenished by direct addition of water as often as desired without danger of electrical shock. If replenishment should be overlooked so that the water should fall to the level of substantial exhaustion as illustrated by line 64 of FIGURE 4, both vaporizers will shut themselves off automatically. Thereafter, when the bucket is replenished with water, vaporizer 2 will remain "off" until button 20 is lifted, but vaporizer 26 will automatically turn itself on.

Figure 5:
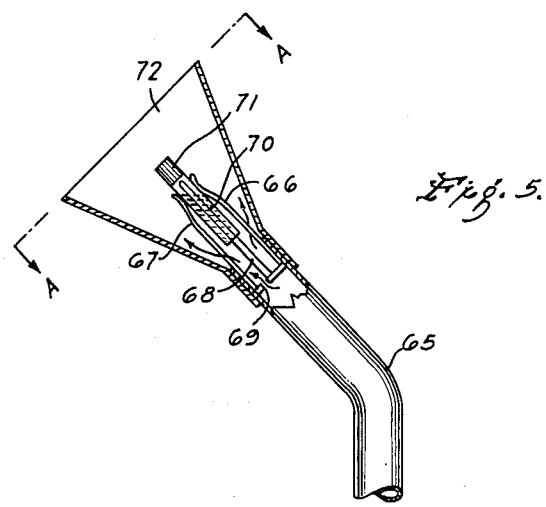
FIG. 5 is a view, largely in vertical section, of a medicament dispenser suitable for use in vaporizers of the present invention.
Figure 6:
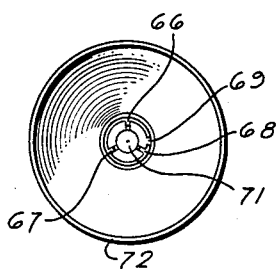
FIG. 6 is a view into the dispenser of FIG. 5 in the direction shown by arrows A—A'.

FIGURES 5 and 6 illustrate a steam diffuser and medicament dispenser suitable for use in combination with vaporizers of the present invention, comprising steam conduit 65 adapted to fit over vapor outlets 6 and 30 of the vaporizers of FIGURES 1 and 2 respectively, medicament vial holder comprising spring metal fingers 66, 67 and 68 attached to base split ring 69 adapted to slide up and down in conduit 65 with a firm friction fit, medicament vial 70 the top of which is closed by vapor-permeable plug 71 and which is slidably held by fingers 66, 67 and 68, and diffuser cone 72 which engages vapor conduit 65 with a friction fit.

In operation, steam flows up conduit 65, through ring 68, between spring strips 66, 67 and 68, and around and past vial 70. Volatile medicinal oil in vial 70 (for example tincture of benzoin) vaporizes through plug 71 at a uniform rate and is swept out of diffuser cone 72 as a part of the stream of steam without contaminating the apparatus. The rate at which medicament vaporizes depends on the position of vial 70, most rapid vaporization occurring when the vial and vial holder are both pushed within conduit 63 (where the temperature is highest).

The invention does not depend upon the materials from which the devices are made. The walls of low thermal conductivity may be of glass or bakelite resin. Supports for components carrying electrical current are advantageously made of ceramic.

The apparatus described above and shown in the drawings constitute specific embodiments of the invention. The scope of the invention is not limited to these embodiments but is as defined by the appended claims.

I claim:

An electric vaporizer adapted to generate a continuous flow of steam from a body of water without creating a thermal or electrical hazard, which comprises in combination a chamber at least the vertical walls of which are of low thermal conductivity, said chamber having a lower orifice adapted to admit water to be vaporized and having an upper orifice adapted to vent steam formed therein; an electrically insulated electrical immersion heater in a lower part of said chamber, said heater being adapted to be connected to a source of electricity and when so connected to bring water in said chamber to the boil; and a switch in series with said heater, said switch comprising a vertically movable vertical shaft spring-loaded so that said spring is compressed when said shaft is in "down" position, said shaft having an upper electrically non-conductive portion, a middle electrically conductive portion, and a lower electrically non-conductive portion, said middle portion having a shoulder at an upper zone thereof, an electrical conductor adapted to engage said shoulder and to hold said shaft in "down" position when said shaft is depressed and the temperature of the surface of the heater therein is not in excess of normal working temperature thereof thereby energizing said heater, and to retract from said shoulder when the temperature of said surface is materially in excess of normal working temperature thereof thereby allowing said vertical shaft to rise whereby said electrical conductor engages said lower electrically non-conductive portion of said shaft.

References Cited in the file of this patent

UNITED STATES PATENTS

| | | |
|---|---|---|
| 1,420,693 | Cohen | June 27, 1922 |
| 1,470,834 | Hasselbach | Oct. 16, 1923 |
| 1,477,339 | Forshee | Dec. 11, 1923 |
| 1,629,640 | Schachtner | May 24, 1927 |
| 1,749,969 | Brodin | Mar. 11, 1930 |
| 1,775,020 | Davin | Sept. 2, 1930 |
| 1,932,447 | Caplan | Oct. 31, 1933 |
| 2,211,407 | Christensen | Aug. 13, 1940 |
| 2,242,066 | Grady | May 13, 1941 |
| 2,274,930 | Newton | Mar. 3, 1942 |
| 2,429,303 | Apatow | Oct. 21, 1947 |
| 2,454,657 | Kuzmin et al. | Nov. 23, 1948 |
| 2,467,630 | Pargman | Apr. 19, 1949 |
| 2,810,381 | Knight | Oct. 22, 1957 |
| 2,847,546 | Crowley et al. | Aug. 12, 1958 |
| 2,847,547 | Gordon | Aug. 12, 1958 |
| 2,883,514 | Gooldy | Apr. 21, 1959 |

FOREIGN PATENTS

| | | |
|---|---|---|
| 372,675 | Germany | Mar. 31, 1923 |
| 383,677 | Great Britain | Nov. 24, 1932 |